United States Patent Office 3,558,552
Patented Jan. 26, 1971

3,558,552
AMIDE OF DIAMINES AS AGE RESISTERS FOR POLYMERS
Ronald B. Spacht, Hudson, Ohio, assignor to The Goodyear Tire & Rubber Company, Akron, Ohio, a corporation of Ohio
No Drawing. Filed Oct. 2, 1967, Ser. No. 672,028
Int. Cl. C08f 45/60
U.S. Cl. 260—45.9                                   6 Claims

ABSTRACT OF THE DISCLOSURE

Certain salicyloyl derivatives such as N-phenyl-N'-salicyloyl-p - phenylenediamine and N-phenyl-N'-3-tertiarybutyl salicyloyl - p - phenylenediamine as antioxidants for oxidizable polymers.

---

This invention relates to age resisters for oxidizable organic materials, their preparation and use in the stabilization of organic materials such as polymers, gasoline, oils, etc. which normally tend to deteriorate when exposed to normal atmospheric conditions and in particular when exposed to sunlight and/or elevated temperature in the presence of air or oxygen.

Polymers, including both natural rubber and synthetic polymers, have proven to be some of the most difficult organic materials to successfully stabilize against the deleterious effects of oxygen, ozone and ultraviolet light. Both vulcanized and unvulcanized natural rubber and synthetic polymers are susceptible to the deleterious effects that are found in normal atmospheric conditions and although many materials have been suggested and used as polymer stabilizers, no completely satisfactory material has been found that will completely protect polymers under the widely different conditions to which they are subjected. The search for new and better polymer stabilizers is, therefore, a problem which continues to command the attention of many skilled investigators.

Phenolic and amine compounds have been among the more commonly used classes of compounds that have found wide scale acceptance as polymer stabilizers, but many of the phenolic antioxidants, although reasonably effective stabilizers for organic materials, tend to be susceptible to being too readily volatilized and, therefore, escape from the materials which they are intended to stabilize during the rather extended service life to which such materials are subjected.

It is, therefore, an object of this invention to provide a new class of relatively nonvolatile antioxidants and stabilizers for organic compounds, in particular, polymers.

In accordance with the present invention it has been found that the foregoing objects can be accomplished by employing as stabilizers for organic materials, particularly polymers, which are subject to the deleterious effects of oxygen, ozone and sunlight, salicyloyl derivatives of aromatic amines conforming to the following structural formula:

$$R^1-\phantom{X}\bigcirc\phantom{X}-NH-OC-\bigcirc-O-R \quad (OH)$$

wherein R is selected from the group consisting of hydrogen, alkyl radicals containing 1 to 12 carbon atoms and alkoxy radicals containing 1 to 12 carbon atoms and $R^1$ is selected from the group consisting of (a) —OH, (b) $\begin{array}{c}R^2\\ \diagdown\\ R^3\diagup\end{array}$N— and (c) $\bigcirc\phantom{X}$—NH— (with $R^4, R^5$)

wherein $R^2$ and $R^3$ are selected from the group consisting of hydrogen and alkyl radicals containing 1 to 8 carbon atoms and $R^4$ and $R^5$ are selected from the group consisting of hydrogen, alkyl radicals containing 1 to 8 carbon atoms and alkoxy radicals containing 1 to 6 carbon atoms.

Examples of specific compounds conforming to the above recited structural formula are as follows:

N-salicyloyl-p-amino phenol
N-salicyloyl-o-amino phenol
N-salicyloyl-m-amino phenol
N-salicyloyl-N'-methyl-p-phenylenediamine
N-salicyloyl-p-phenylenediamine
N-4-ethyl salicyloyl-p-amino phenol
N-4-ethoxy salicyloyl-p-amino phenol
N-salicyloyl-N',N'-dimethyl-p-phenylenediamine
N-salicyloyl-N',N'-diethyl-p-phenylenediamine
N-salicyloyl-N',N'-dimethyl-o-phenylenediamine
N-salicyloyl-N',N'-dimethyl-m-phenylenediamine
N-4-methyl salicyloyl-N',N'-dimethyl-p-phenylenediamine
N-4-ethoxy salicyloyl-N',N'-dimethyl-p-phenylenediamine
N-phenyl-N'-salicyloyl-p-phenylenediamine
p-Butylphenyl-N'-salicyloyl-p-phenylenediamine
N-o-tolyl-N'-salicyloyl-p-phenylenediamine
N-phenyl-N'-4-isopropyl salicyloyl-p-penylenediamine
N-p-anisyl-N'-salicyloyl-p-phenylenediamine Preferred compounds within the scope of the present invention are those conforming to the above recited structural formula wherein R is a tertiary alkyl radical containing 4 to 12 carbon atoms and is located in a position ortho to the phenolic hydroxy group and wherein $R^1$ is selected from the group consisting of (a) $\begin{array}{c}R^2\\ \diagdown\\ R^3\diagup\end{array}$N— and (b) $\bigcirc\phantom{X}$—NH— (with $R^4, R^5$)

wherein $R^2$ and $R^3$ are selected from the group consisting of alkyl radicals containing 1 to 8 carbon atoms and $R^4$ and $R^5$ are selected from the group consisting of hydrogen, alkyl radicals containing 1 to 4 carbon atoms and alkoxy radicals containing 1 to 2 carbon atoms.

Examples of these preferred compounds are as follows:

N-phenyl-N'-3-tertiarybutyl salicyloyl-p-phenylenediamine
N-phenyl-N'-3-tertiaryhexyl salicyloyl-p-phenylenediamine
N-phenyl-N'-3-tertiaryoctyl salicyloyl-o-phenylenediamine
N-phenyl-N'-3-tertiaryamyl salicyloyl-m-phenylenediamine N-p-tolyl-N'-3-tertiarybutyl salicyloyl-p-phenylenediamine N-o-tolyl-N'-3-tertiaryhexyl salicyloyl-p-phenylenediamine N,N-dimethyl-N'-3-tertiarybutyl salicyloyl-p-phenylenediamine N,N-diethyl-N'-3-tertiaryhexyl salicyloyl-p-phenylenediamine N,N-dibutyl-N'-3-tertiaryoctyl salicyloyl-p-phenylenediamine N,N-dimethyl-N'-3-tertiarybutyl salicyloyl-o-phenylenediamine N,N-dipropyl-N'-3-tertiaryamyl salicyloyl-m-phenylenediamine Most preferred are the compounds conforming to the above recited structural formula wherein $R^1$ is a radical of the structure:

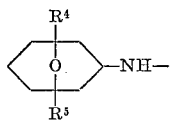

wherein $R^4$ and $R^5$ are selected from the group consisting of hydrogen, alkyl radicals containing 1 to 4 carbon atoms and alkoxy radicals containing 1 to 2 carbon atoms.

Examples of the most preferred compounds are as follows:

N-phenyl-N'-salicyloyl-p-phenylenediamine
N-phenyl-N'-3-tertiarybutyl salicyloyl-p-phenylenediamine
N-p-tolyl-N'-salicyloyl-p-phenylenediamine
N-p-tolyl-6'-3-tertiaryamyl salicyloyl-p-phenylenediamine
N-4-ethoxy phenyl-N'-salicyloyl-p-phenylenediamine
N-4-methoxy phenyl-N'-3-tertiarybutyl salicyloyl-p-phenylenediamine
N-o-tolyl-N'-salicyloyl-p-phenylenediamine
N-2-methoxy phenyl-N-3-tertiaryhexyl salicyloyl-p-phenylenediamine
N-2,4-dimethyl phenyl-N'-salicyloyl-p-phenylenediamine
N-2,4-dimethyl phenyl-N'-3-tertiarybutyl salicyloyl-p-phenylenediamine A particularly preferred compound is N-phenyl-N'-salicyloyl-p-phenylenediamine.

The salicyloyl derivatives of this invention may be made by reacting the phenyl or substituted phenyl salicylates with an aromatic primary amine at elevated temperatures (150 to 250° C.). After the reaction is complete the excess phenol is removed. The remaining reaction product may be used as is or recrystallized from an appropriate solvent.

The compounds of this invention may be added to the polymer when it is in the form of a latex or solution or in solid form or when vulcanized. They are highly efficient and capable of being employed in relatively small amounts to effectively stabilize the polymers into which they are incorporated. The precise amount of these highly effective stabilizers which is to be employed will depend somewhat on the nature of the polymer and the severity of the deteriorating conditions to which the polymer is to be exposed. It has been found that an effective stabilizing amount of the disclosed stabilizers will generally range from 0.05 to 8.0 percent by weight based on the weight of the polymer although in most rubbery polymers it is commonly preferred to use from 0.5 to 2.0 percent by weight based on the weight of the rubber. In the stabilization of relatively unsaturated polymers such as polyethylene levels of 0.001 part and lower will afford protection.

The polymers that may be conveniently protected by the phenolic compounds in accordance with this invention are vulcanized and unvulcanized oxidizable polymers such as natural rubber and those synthetic oxidizable polymers which are normally susceptible to deterioration by sunlight and atmospheric oxygen such as the synthetic polymers and copolymers prepared from conjugated dienes as well as the synthetic polymers and copolymers prepared from monoolefins. Representative examples of the synthetic polymers used in the practice of this invention are polychloroprene; homopolymers of a conjugated 1,3-diene such as isoprene and butadiene and in particular, polyisoprenes and polybutadienes having essentially all of their segmeric units combined in a cis-1,4- structure; copolymers of a conjugated 1,3-diene such as isoprene and butadiene with up to 50 percent by weight of at least one copolymerizable ethylenically unsaturated monomer such as styrene, acrylonitrile, unsaturated carboxylic acids, including acrylic, methacrylic, fumaric and itaconic acid; butyl rubber, which is a polymerization product of a major proportion of a monoolefin and a minor proportion of a multiolefin such as butadiene or isoprene; and polymers and copolymers of monoolefins containing little or no unsaturation, such as polyethylene, polypropylene, ethylene propylene copolymers and terpolymers of ethylene, propylene and a nonconjugated diene.

The practice of this invention is found particularly beneficial when applied to the stabilization of natural rubber and homopolymers of a conjugated 1,3-diene such as isoprene and butadiene and copolymers of said diene with up to 50 percent by weight of at least one copolymerizable monomer such as styrene and acrylonitrile.

The following Examples 1 to 3 illustrate the preparation of materials according to the practice of the present invention but are not intended to so limit the scope of the invention.

EXAMPLE 1

Ninety-two grams of p-aminodiphenylamine and 125 grams of phenyl salicylate were heated between 180 and 185° C. for 7½ hours. The reaction mass was then heated to 185° C. at 25 mm. of Hg to remove 45.5 grams of phenol that had formed. The residue, weighing 132 grams, melted between 151 and 154° C. This represents a yield of about 87 percent.

The product, N-phenyl-N'-salicyloyl-p-phenylenediamine, was recrystallized twice from hot toluene and found to contain 9.18 percent nitrogen compared to a theoretical value of 9.21 percent.

EXAMPLE 2

Eighty two grams of N,N diethyl-p-phenylenediamine and 125 grams of phenyl salicylate were heated between 175 and 180° C. for six hours. They were then heated under vacuo to remove phenol. The weight of product obtained was 151.0 grams, a quantitative yield. The product was essentially N-salicyloyl-N',N'-diethyl-p-phenylenediamine.

EXAMPLE 3

One hundred and nine grams of p-amino phenol and 240 grams of phenyl salicylate were heated for five hours at 195° C. followed by heating under vacuo to remove the phenol formed. The residue was then extracted with toluene to remove excess phenyl salicylate. Weight of final product was 163.0 grams. The product had a melting point of 172° C. to 173.5° C. and a nitrogen value of 6.02 percent compared to a theoretical nitrogen content for N-salicyloyl-p-amino phenol of 6.1 percent.

EXAMPLE 4

The antioxidant properties of the products of Examples 1, 2 and 3 were measured by oxygen absorption tests by dissolving in benzene portions of an SBR polymer (1006) containing 1.00 part per 100 parts of rubbery polymer of the products of Examples 1, 2 and 3. The cements so formed were poured onto aluminum foil so as to form a thin film and dried to obtain the weight of rubber for each sample. Thereafter the foil with the adhering rubber strip was placed in an oxygen absorption apparatus. The amount of oxygen absorbed in a particular interval of time was determined and recorded in the following Table I. This testing procedure is described in further detail in Industrial and Engineering Chemistry, 43, p. 456 (1951) and Industrial and Engineering Chemistry, 45, p. 392 (1953).

TABLE I

| Experiment | Antioxidant | Oxygen absorption hours/percent oxygen absorbed |
|---|---|---|
| A | Commercial phenolic antioxidant [1] | 403/1.0 |
| B | N-phenyl-N'-salicyloyl-p-phenylenediamine. | 668/0.38 |
| C | N-salicyloyl-p-amino phenol | 79/1.0 |
| D | Commercial phenolic antioxidant [1] | 212/1.0 |
| E | N,N-diethyl-N'-salicyloyl-p-phenylenediamine. | 63/1.0 |

[1] An alkylated phenol.

An unstabilized SBR 1006 would normally reach a value of 1.0 percent in 2 to 24 hours, most normally in about four hours. Experiments B and C were run separately from Experiment E. Therefore the control run with Experiments B and C (Experiment A) and the control run with Experiment E (Experiment D) have been listed. As the above data demonstrate, all of the stabilizers within the scope of the present invention (Experiments B, C and E) afforded the SBR polymer protection against oxygen degradation. N-phenyl-N'-salicyloyl-p-phenylenediamine (Experiment B) was greatly superior to the other stabilizers tested.

EXAMPLE 5

The products of Examples 1, 2 and 3 were also used to stabilize an extracted pale crepe natural rubber. One part of each product was added to a portion of the natural rubber as part of the following formualtion:

Ingredients:                                    Parts
    Extracted pale crepe _____  100
    ZnO _____    5
    Sulfur _____    3
    Hexamethylene tetramine _____    1
    Stearic acid _____    1.5
    Antioxidant _____    1

The compounded rubber was then vulcanized at 285° C. for 50 minutes. The three vulcanized samples were aged in an oxygen bomb at a temperature of 50° C. under a pressure of 150 p.s.i. for 18 days along with an unstabilized portion of the natural rubber. Tensile measurements were made both before and after aging. The percent tensile retention was determined by dividing the tensile of the aged material by the tensile of the unaged material and multiplying by 100. The test results are listed in the following Table II.

TABLE II

| Experiment | Antioxidant | Tensile, p.s.i. Unaged | Tensile, p.s.i. Aged | Percent tensile retention |
|---|---|---|---|---|
| F | None | 2,100 | 0 | 0 |
| G | N-phenyl-N'-salicyloyl-p-phenylenediamine, Example 1. | 1,850 | 1,930 | 104.2 |
| H | N-salicyloyl-p-aminophenol, Example 2. | 2,190 | 490 | 22.2 |
| I | N',N'-diethyl-N-salicyloyl-p-phenylenediamine, Example 3. | 1,770 | 1,900 | 107.2 |

The above tensile retention data reveal that all of the stabilizers within the scope of the present invention (Experiments G, H and I) afforded protection to the natural rubber. The N-phenyl-N'-salicyloyl-p-phenylenediamine and N,N-diethyl-N'-salicyloyl-p-phenylenediamine were particularly effective, allowing no reduction in tensile whatsoever on aging.

In addition to protecting polymers against degradation by oxygen, the salicyloyls of the present invention also show absorption of ultraviolet light in the region most detrimental to polymers. Materials which absorb ultraviolet light in this region are known in general to be inhibitors of polymeric degradation due to ultraviolet light.

These salicyloyls are also effective as metal deactivators in systems where the presence of metal accelerates the deterioration of polymers. In addition, these compounds are less discoloring in a polymeric environment than many amine age resisters.

While certain representative embodiments and details have been shown for the purpose of illustrating the invention, it will be apparent to those skilled in this art that various changes and modifications may be made therein without departing from the spirit or scope of the invention.

What I claim is:

1. Vulcanized and unvulcanized oxidizable polymers selected from the group consisting of natural rubber and synthetic oxidizable polymers selected from the group consisting of polychloroprene, homopolymers of a conjugated 1,3-diene, copolymers of a conjugated 1,3-diene with up to 50 percent by weight of at least one copolymerizable ethylenically unsaturated monomer, butyl rubber, polyethylene, polypropylene, ethylene propylene conpolymers and terpolymers of ethylene, propylene, and a non-conjugated diene, said polymer containing a stabilizing amount of at least one compound having the following structural formula

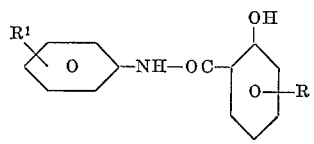

wherein R is selected from the group consisting of hydrogen, alkyl radicals containing 1 to 12 carbon atoms and alkoxy radicals containing 1 to 12 carbon atoms and $R^1$ is selected from the group consisting of

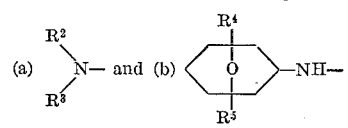

wherein $R^2$ and $R^3$ are selected from the group consisting of hydrogen and alkyl radicals containing 1 to 8 carbon atoms and $R^4$ and $R^5$ are selected from the group consisting of hydrogen, alkyl radicals containing 1 to 8 carbon atoms and alkoxy radicals containing 1 to 6 carbon atoms.

2. The polymers according to claim 1 wherein R is a tertiary alkyl radical containing 4 to 12 carbon atoms and is located in a position ortho to the phenolic hydroxy group and wherein $R^1$ is selected from the group consisting of (a)

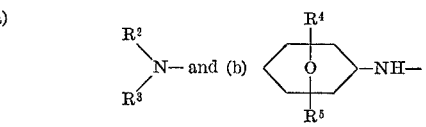

wherein $R^2$ and $R^3$ are selected from the group consisting of hydrogen and alkyl radicals containing 1 to 4 carbon atoms and $R^4$ and $R^5$ are selected from the group consisting of hydrogen, alkyl radicals containing 1 to 8 carbon atoms and alkoxy radicals containing 1 to 2 carbon atoms.

3. The polymers according to claim 1 wherein $R^1$ is a radical of the structure:

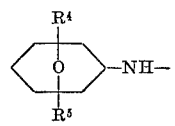

wherein $R^4$ and $R^5$ are selected from the group consisting of hydrogen, alkyl radicals containing 1 to 4 carbon atoms and alkoxy radicals containing 1 to 2 carbon atoms.

4. The polymers according to claim 1 wherein the compound is N - phenyl - N' - salicyloyl-p-phenylenediamine.

5. The polymers according to claim 1 wherein the homopolymers of a conjugated 1,3-diene are polybutadiene and polyisoprene, wherein the conjugated 1,3-diene in the copolymers of a conjugated 1,3-diene is selected from the group consisting of butadiene and isoprene and wherein the ethylenically unsaturated monomer is selected from the group consisting of styrene, acrylonitrile, and unsaturated carboxylic acids.

6. The polymers according to claim 1 wherein the compound is selected from the group consisting of N-salicyloyl-N'-methyl-p-phenylenediamine
N-salicyloyl-p-phenylenediamine
N-salicyloyl-N',N'-dimethyl-p-phenylenediamine
N-salicyloyl-N',N'-diethyl-p-phenylenediamine
N-salicyloyl-N',N'-dimethyl-o-phenylenediamine
N-salicyloyl-N',N'-dimethyl-m-phenylenediamine
N-4-methyl salicyloyl-N',N'-dimethyl-p-phenylenediamine
N-4-ethoxy salicyloyl-N',N'-dimethyl-p-phenylenediamine
p-Butylphenyl-N'-salicyloyl-p-phenylenediamine
N-phenyl-N'-4-isopropyl salicyloyl-p-phenylenediamine
N-p-anisyl-N'-salicyloyl-p-phenylenediamine
N-phenyl-N'-3-tertiaryhexyl salicyloyl-p-phenylenediamine
N-phenyl-N'-3-tertiaryoctyl salicyloyl-o-phenylenediamine
N-phenyl-N'-3-tertiaryamyl salicyloyl-m-phenylenediamine
N-p-tolyl-N'-3-tertiarylbutyl salicyloyl-p-phenylenediamine
N-o-tolyl-N'-3-tertiaryhexyl salicyloxy-p-phenylenediamine
N,N-dimethyl-N'-3-tertiarybutyl salicyloyl-p-phenylenediamine
N,N-diethyl-N'-3-tertiaryhexyl salicyloyl-p-phenylenediamine
N,N-dibutyl-N'-3-tertiaryoctyl salicyloyl-p-phenylenediamine
N,N-dimethyl-N'-3-tertiarybutyl salicyloyl-o-phenylenediamine
N,N-dipropyl-N'-3-tertiaryamyl salicyloyl-m-phenylenediamine
N-phenyl-N'-salicyloyl-p-phenylenediamine
N-phenyl-N'-3-tertiarybutyl salicyloyl-p-phenylenediamine
N-p-tolyl-N'-salicyloyl-p-phenylenediamine
N-p-tolyl-N'-3-tertiaryamyl salicyloyl-p-phenylenediamine
N-4-ethoxy phenyl-N'-salicyloyl-p-phenylenediamine
N-4-methoxy phenyl-N'-3-tertiarybutyl salicyloyl-p-phenylenediamine
N-o-tolyl-N'-salicyloxy-p-phenylenediamine
N-2-methoxy phenyl-N-3-tertiaryhexyl salicyloyl-p-phenylenediamine
N-2,4-dimethyl phenyl-N'-salicyloyl-p-phenylenediamine
N-2,4-dimethyl phenyl-N'-3-tertiarylbutyl salicyloyl-p-phenylenediamine

References Cited

UNITED STATES PATENTS

| | | | |
|---|---|---|---|
| 1,899,856 | 2/1933 | De Montmolun et al. | 260—559 |
| 2,486,538 | 11/1949 | Thompson | 44—73 |
| 2,879,823 | 3/1959 | Smith | 260—45.9 |
| 3,020,259 | 2/1962 | Schulde et al. | 260—45.9 |
| 3,072,573 | 1/1963 | Spacht | 260—45.9 |
| 3,364,195 | 1/1968 | Huey et al. | 260—192 |
| 1,907,545 | 5/1933 | Howland | 260—808 |
| 3,377,315 | 4/1968 | Ashton et al. | 260—808 |
| 3,189,647 | 4/1965 | Symon | 260—45.9 |

HOSEA E. TAYLOR, Primary Examiner

U.S. Cl. X.R.

44—73; 252—51.5; 260—45.9, 45.95, 809, 814